United States Patent [19]
Gesell et al.

[11] Patent Number: 5,202,776
[45] Date of Patent: Apr. 13, 1993

[54] TIME DELAY BEAM FORMATION

[75] Inventors: Leslie H. Gesell; James L. Lafuse, both of Columbia, Md.

[73] Assignee: Essex Corporation, Columbia, Md.

[21] Appl. No.: 806,697

[22] Filed: Dec. 12, 1991

[51] Int. Cl.[5] .................... G02B 5/32; G02B 27/00; G02F 1/33; G02F 1/11
[52] U.S. Cl. .................... 359/17; 359/306; 359/287; 359/310; 359/577; 356/345
[58] Field of Search ............ 359/17, 20, 561, 305, 359/306, 310, 287, 578, 577; 356/345

[56] References Cited
U.S. PATENT DOCUMENTS

| | | | |
|---|---|---|---|
| 3,512,871 | 5/1970 | Zweig | 359/310 |
| 3,630,593 | 12/1971 | Bartelt et al. | 359/20 |
| 4,426,134 | 1/1984 | Abramovitz et al. | 359/306 |
| 4,558,925 | 12/1985 | Casseday et al. | 359/306 |
| 4,644,267 | 2/1987 | Tsui et al. | 359/310 |
| 5,002,395 | 3/1991 | Shah | 359/305 |

Primary Examiner—Bruce Y. Arnold
Assistant Examiner—Evelyn A. Lester
Attorney, Agent, or Firm—Spensley Horn Jubas & Lubitz

[57] ABSTRACT

Optical systems are disclosed which are capable of generating and rapidly changing time delays of electrical signals for true time delay beam formation and beam steering. The systems utilize an interferometer configuration. A first optical modulator and a Fourier transform lens define a Fourier transform plane in a first leg of the interferometer. In a second leg of the interferometer, a second optical modulator provides beam steering to a prism stack, which produces a set of plane reference waves having a range of orientations required to generate a desired range of time delays. Preferably the optical modulators are acousto optic Bragg cells. Alternatively, a holographic optic element could be used in place of the prism stack.

15 Claims, 3 Drawing Sheets

TIME DELAY BEAM FORMATION

BACKGROUND OF THE INVENTION

1. Field of the Invention

The present invention relates to a system for generating and rapidly changing the time delays of electrical signals for true time delay beam formation and steering.

2. Description of Related Art

The use of wide aperture, wide bandwidth phase steered array antennas for transmitting and receiving wideband signals is a known technique. Such known antennas suffer from a problem of beam dispersion or broadening when steering away from the array normal.

Attempts have been made to avoid this problem of beam dispersion through the use of time delays between the array elements. One approach for implementing true time delay beam formation is to switch in different lengths of signal transmission delay lines between the common signal source and the antenna array elements. This known approach tends to be bulky and cumbersome for scanning an array with a large number of array elements over a wide range of nearly continuous angles.

It is an object of the present invention to provide a system that is simple and that does not require a bulky and complex implementation.

It is a further object of the present invention to provide a system for implementing true time delay beam formation that may fit into a small lightweight package, that is relatively rugged, and that consumes relatively small amounts of power.

SUMMARY OF THE INVENTION

In accordance with the present invention, these and other objectives are achieved by providing a system in which time delays may be generated by using an acousto-optic (AO) Bragg cell as a continuous tapped delay line. Selected points in the Bragg cell may be optically mapped to the output. The optical mapping may be controlled using additional optical and acousto-optical devices. The optical mapping may make use of prisms and/or holographic optical elements, in addition to other standard passive optical elements.

A system in accordance with the present invention is capable of generating and rapidly changing time delays for true time delay beam formation and steering. A system in accordance with the present invention enables a time delay beam formation array to simultaneously scan multiple beams rapidly over a continuum of angles.

A system in accordance with the present invention may be used, for example, in airborne reconnaissance and surveillance, space-based radar, satellite communications, or large space-based arrays, where size, weight and power are major considerations.

A system in accordance with the present invention does not require a bulky and complex implementation. The hardware required to implement a true time delay beam formation system in accordance with the present invention may fit into a small lightweight package, may be rugged, and may consume relatively small amounts of power. The simplicity and compactness of the system dramatically reduces unwanted variability in the relative time delays.

BRIEF DESCRIPTION OF THE DRAWINGS

A detailed description of a preferred embodiment of the present invention will be made with reference to the accompanying drawings.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
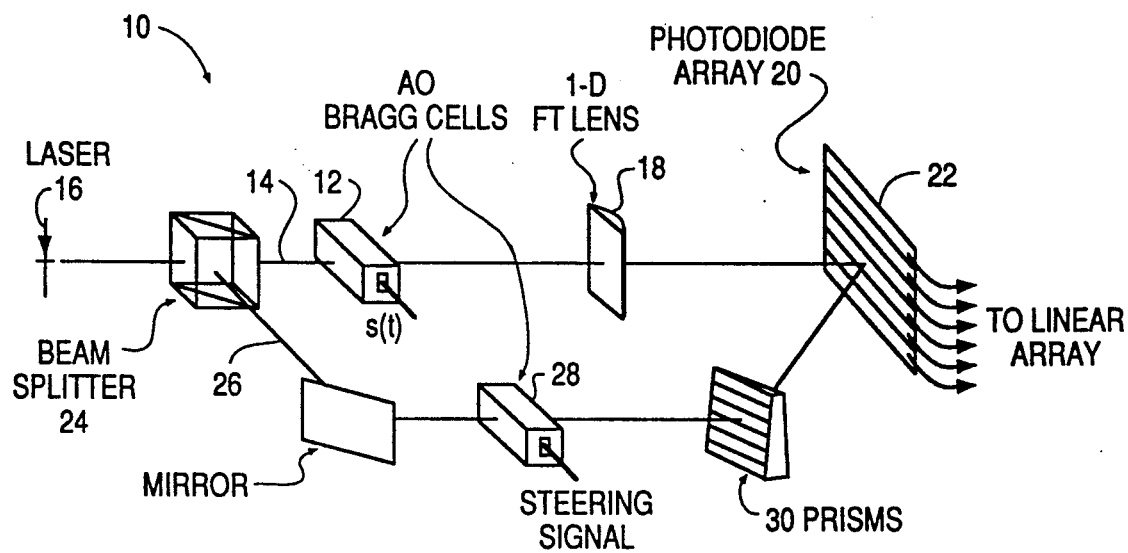
FIG. 1 shows an example of an acousto-optic system for generating a time delay for a one-dimensional transmitting array.

FIG. 1 shows an example of an acousto-optic system 10 for generating time delays for a one-dimensional transmitting array. The skilled artisan will recognize a resemblance between the system 10 shown in FIG. 1 as a Mach-Zehnder interferometer.

The signal to be transmitted may be represented by $s(t)$, where the complex amplitude of the signal s is a function of time t. The signal $s(t)$ drives an acousto-optic Bragg cell 12 located in a first leg 14 of the interferometer system 10. Coherent light from a laser source 16 may be passed through the Bragg cell 12 and may be modulated by the signal $s(t)$.

A Fourier transform lens 18 may also be provided in the first leg 14 of the interferometer system 10. Light that is passed through the Fourier transform lens 18 is separated into a spectrum. Modulated light exiting from the Bragg cell 12 may be passed through the Fourier transform lens 18, thereby causing the spectrum of the modulated light signal to illuminate an array 20 of wideband photodiodes 22. In the system illustrated in FIG. 1, the photodiode array 20 is preferably located in the Fourier transform plane of the first Bragg cell 12.

Each of the photodiodes 22 in the photodiode array 20 is preferably narrower in one dimension and wider in another dimension. As shown in FIG. 1, for example, each of the photodiodes 22 is narrower in the vertical dimension and wider in the horizontal dimension. The width of each photodiode 22 is preferably large enough to capture the full spectrum of the modulated light signal illuminating the photodiode.

The interferometer system 10 illustrated in FIG. 1 also includes a beam splitter 24. The beam splitter 24 splits the coherent light from the laser source 16 into a first leg 14 and a second leg 26.

The second leg 26 includes a second Bragg cell 28. A beam steering signal may be inserted into the second Bragg cell 28. For a single beam, the beam steering signal may be in the form of a sine wave. For forming and steering multiple beams, multiple sine waves may be used.

The second leg 26 of the interferometer system 10 may also be provided with a stack of prisms 30. The stack of prisms 30 performs the function of creating, from the output of the second Bragg cell 28, a set of plane reference waves having a range of orientations required to generate a desired range of time delays.

More specifically, the prism stack 30 performs the function of taking an input beam from the second Bragg cell 28 at incidence angle $\theta'$ and producing multiple output beams at angles $\theta$ proportional to $\theta'$. For example, if the input angle is $\theta'$, then the output angles would be $a\theta'+k$, $b\theta'+k$, $c\theta'+k$, etc. The prism stack 30 thereby performs the function of mapping a single angle into multiple angles. The difference between successive output angles of the prism stack 30 is a function of the input angle $\theta'$, thereby producing variable differential time delays.

Alternatively, the prism stack 30 may be replaced by a holographic optic element. Such a holographic optic element would similarly perform the function of creating, from the output of the second Bragg cell 28, a set of plane reference waves having a range of orientations required to generate a desired range of time delays. In the two dimensional system shown in FIG. 4, for example, the volume hologram 150 performs substantially the same function as the prism stack 30 in the one-dimensional system shown in FIG. 1. Prisms or volume hologram elements may be used for beam formation in antennas having array elements arranged linearly, as well as antennas having array elements lying along a curve.

Referring to FIG. 1, the optics in the second leg 26 are preferably arranged so that there is a one-to-one correspondence between the photodiodes 22 of the photodiode array 20 and the prisms of the prism stack 30, whereby each photodiode 22 in the photodiode array 20 is illuminated by a reference plane wave output of a corresponding prism of the prism stack 30.

The interferometer system 10 illustrated in FIG. 1 is arranged so that the signal spectrum associated with the first leg 14 and the reference plane wave associated with the second leg 26 interfere at the photodiode array 20. Each of the photodiodes 22 detects the interference between the signal spectrum and the reference plane wave. Each of the photodiodes 22 produces an output signal that corresponds to the detected interference, integrated over the width of the photodiode. Since the width of each photodiode 22 is preferably large enough to capture the full signal spectrum, the integration occurs over the full spectral frequency.

The output signal of each of the photodiodes 22 corresponds to a delayed replica of the input signal. The amount of the delay is determined by the angle between the reference plane wave and the surface of the photodiode 22.

The output of the photodiode array 20 may be sent to a linear transmitting array (not shown). In a preferred embodiment, there is a one-to-one correspondence between each photodiode 22 of the photodiode array 20 and each element of the transmitting array.

The following paragraphs provide a mathematical description of how a system such as that shown in FIG. 1 may generate variable time delays.

Figure 2:
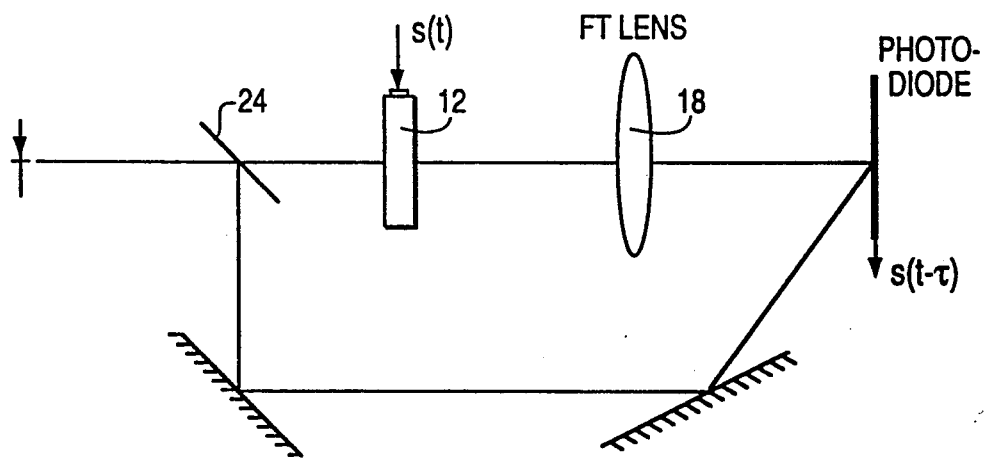
FIG. 2 shows an example of an acousto-optic system for generating a signal time delay.
Figure 3:
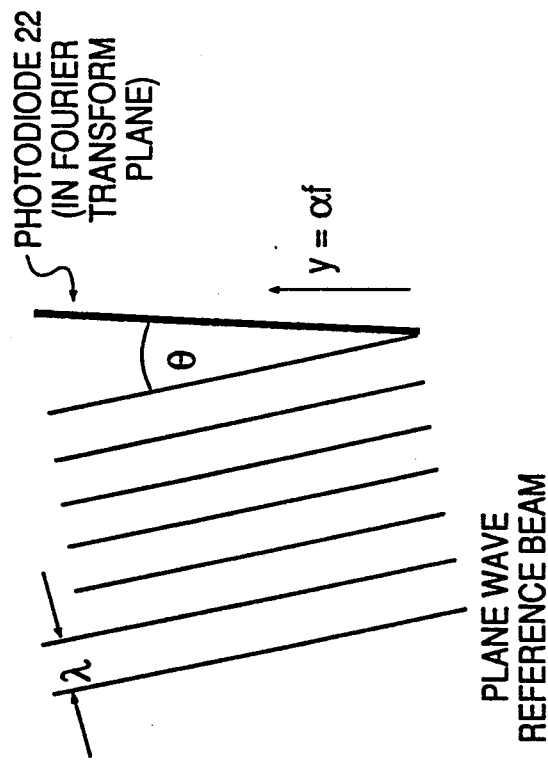
FIG. 3 shows an example of a reference wave on a photodiode.

As shown in FIGS. 2 and 3, a reference plane wave makes an angle $\theta$ with the surface of a photodiode 22. The reference plane wave at the surface of the photodiode 22 may be represented mathematically by:

$$r(t,y) = e^{j2\pi f_0(t - \frac{y}{\lambda}\sin\theta)} = e^{j2\pi f_0(t - \frac{y}{c}\sin\theta)} \quad (1)$$

where y represents the physical distance along the photodiode 22, $\lambda$ represents the optical wavelength of the reference plane wave, $f_0$ represents the optical carrier frequency of the reference plane wave, and c represents the velocity of light. The spectral frequency f of the signal in the Fourier transform plane is proportional to the physical distance y along the photodiode 22. Therefore, a factor $\tau$, having units of time, may be defined such that:

$$f\tau = -f_0\frac{y}{c}\sin\theta \quad (2)$$

As indicated in Equation (2), the factor $\tau$ is proportional to $\sin(\theta)$. The reference plane wave at the photodiode may therefore be expressed as, $$r(t,f) = e^{j2\pi f\tau}e^{j2\pi f_0 t} \quad (3)$$

In the first leg 14 of the interferometer system 10, a coherent optical beam, modulated and Doppler shifted by the frequency component S(f) of the signal, also illuminates the photodiode 22. At the photodiode 22 this modulated coherent beam has the following functional form:

$$S(f)e^{j2\pi ft}e^{j2\pi f_0 t} \quad (4)$$

The oscillators, $$e^{j2\pi ft} \text{ TM} \quad (5)$$

result from the fact that each frequency component of the signal in the first Bragg cell 12 Doppler shifts the optical carrier by the frequency of that component.

To negate the Doppler shift of the steering signal, a point modulator may be placed in the second leg 26 of the interferometer system to downshift the frequency of the optical beam by the frequency of the steering signal. This Doppler shift could also be removed electrically at the photodiode output.

The sum of the beams illuminating the photodiode may be square-law detected using the photodiode. The output d(t) of the photodiode at each instant of time is equal to the square-law detection integrated along the length of the photodiode (i.e., integrated with respect to the frequency f):

$$d(t) = \int |r(t,f) + S(f) \cdot e^{j2\pi ft}e^{j2\pi f_0 t}|^2 df \quad (6a)$$
$$= \int |e^{j2\pi f\tau}e^{j2\pi f_0 t} + S(f) \cdot e^{j2\pi ft}e^{j2\pi f_0 t}|^2 df \quad (6b)$$
$$= \int [1 + |S(f)|^2 + 2\text{Real}(S(f)e^{j2\pi f(t-\tau)})] df \quad (6c)$$
$$= \text{bias} + 2\text{Real}[\int S(f)e^{j2\pi f(t-\tau)} df] \quad (6d)$$

Consequently, the photodiode output d(t) may be represented as, $$d(t) = \text{bias} + 2\text{Real}[s(t-\tau)] \quad (7)$$

As indicated in Equation (7), the photodiode output d(t) is equal to the input signal s(t) delayed by a time $\tau$.

The delay time $\tau$ is proportional to the sine of the angle of incidence of the reference plane wave on the photodiode. The bias allows negative and positive values of the delayed signal to be represented.

A physical explanation of how an acousto-optic system (as shown, for example, in FIGS. 1, 2 and 3) can produce an output signal that is a delayed replica of the input signal, with the amount of the delay being determined by the angle of incidence of the reference plane wave on the photodiode, is as follows:

Since the photodiode coherently sums all of the frequency components of the signal s(t), only those components of the spectrum that are in phase with one another, after being phase shifted by the reference signal, will lead to a significant output signal relative to the bias. Since the reference signal is a plane wave, the component of the signal spectrum, in optical form, that contributes to an output signal must also be a plane wave if, after being phase shifted by the reference signal, all points on the photodiode are to be at the same phase. Referring to FIG. 1, for example, components of the optical signal that contribute to a plane wave in the Fourier plane (at the photodiode array 20) come from a single point in the Bragg cell 12. Thus, the reference wave selects which point in the Bragg cell 12 (a delay line) is mapped to the output. The angle of the reference wave determines the delay of the output signal relative to the input signal.

The systems described above relate generally to systems for generating a time delay for a one-dimensional transmitting array. In the above-described systems, the photodiode array is preferably located in the Fourier transform plane of the first Bragg cell. Time delays may also be generated by placing the photodiode array in the image plane of the first Bragg cell. Placement of the photodiode array in the image plane of the first Bragg cell is particularly appropriate for two-dimensional array beam formation.

Figure 4:
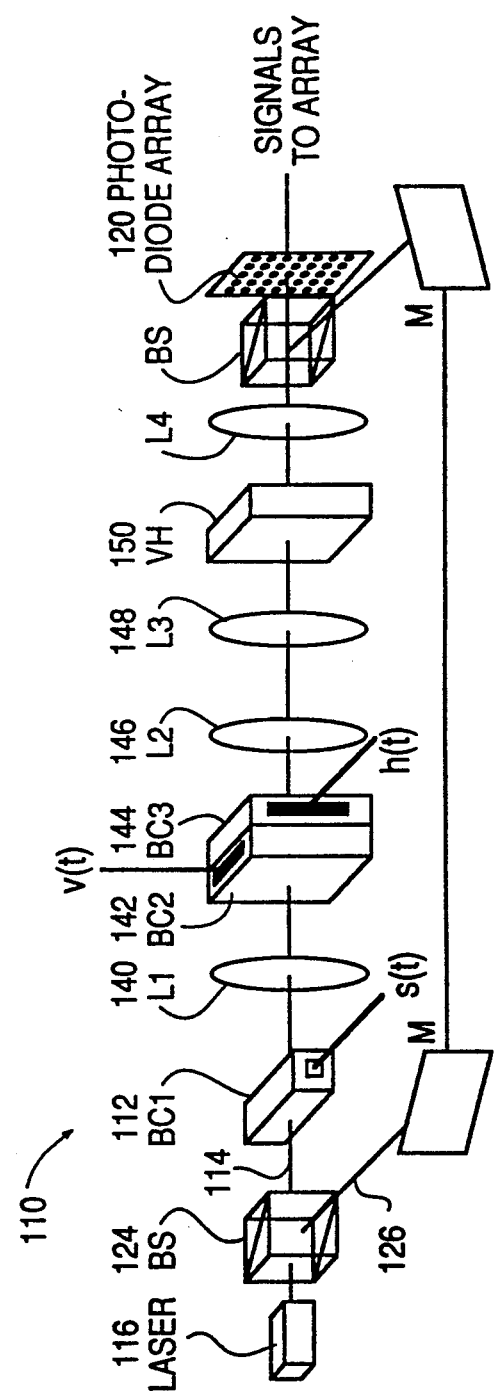
FIG. 4 shows an example of an acousto-optic system for generating a time delay for a two-dimensional transmitting array.

FIG. 4 shows an example of a system 110 for generating time delays of a signal for forming and steering the beam of a two-dimensional (planar) array. The skilled artisan will recognize a resemblance between the system 110 shown in FIG. 4 and a Mach-Zehnder interferometer.

In the system 110 illustrated in FIG. 4, time delays may be generated by placing a photodiode array 120 in an image plane of a first Bragg cell 112 and optically mapping points in the first Bragg cell 112 onto the photodiode array 120. The electrical outputs of the photodiode array 120 are time delayed replicas of the signal s(t). These time delayed replicas of the signal s(t) are then sent to the elements of the planar array.

In the system 110 for a two-dimensional transmitting array shown in FIG. 4, each of the photodiodes in the photodiode array 120 sees only the image of a single point in the first Bragg cell 112. Consequently, both the vertical and horizontal dimensions of each photodiode in the photodiode array 120 are preferably relatively small. In contrast, in the system 10 for a one-dimensional transmitting array shown in FIG. 1, the photodiode array 20 is preferably located in the Fourier transform plane of the first Bragg cell 12. The width of each photodiode 22 in the photodiode array 20 is preferably large enough in the horizontal dimension to capture the full spectrum of the modulated light signal illuminating the photodiode.

As shown in FIG. 4, a collimated coherent laser beam from a laser source 116 is divided into a first leg 114 and a second leg 126 by a beam splitter 124. The optical beam passing through the second leg 126 provides a reference at the photodiode array 120 for heterodyne detection, so that the voltages from the electrical signals out of the photodiode array 120 are proportional to the voltages of the time delayed replicas of the input signal to the device. Although the embodiment illustrated in FIG. 4 shows a reference beam generated by a beam splitter 124, it is noted that neither the reference beam nor the beam splitter are required elements of the invention. For example, a reference beam may be provided by a separate coherent light source. Alternatively, if the signal to be delayed is of an on-off modified type, then no reference beam may be required.

In the first leg 114 the input electrical signal s(t), the signal to be transmitted by the RF planar array, drives the first acousto-optic Bragg cell 112. The result is that the first Bragg cell 112 which is a delay line contains a time span of the signal, in acoustic form, from time $t-T_a$ to time t, where $T_a$ represents the time aperture of the first Bragg cell 112. The coherent laser beam passing through the first Bragg cell 112 may be modulated by the signal and Fourier transformed by a first lens 140. Points in the first Bragg cell 112 are plane waves at a second Bragg cell 142 and a third Bragg cell 144. The angular orientations of the plane waves are determined by the positions of the points in the first Bragg cell 112.

The mapping of points in the first Bragg cell 112 to the photodiode array 120 is controlled by the frequencies of a vertical electrical signal v(t) and a horizontal electrical signal h(t) that drive the second Bragg cell 142 and the third Bragg cell 144. Both the vertical signal v(t) and the horizontal signal h(t) are preferably sine waves. The signal in the second Bragg cell 142 changes the angular orientation of the plane waves passing through the second Bragg cell with respect to vertical. The signal in the third Bragg cell 144 changes the angular orientation of the plane waves passing through the third Bragg cell with respect to horizontal.

The positions and focal lengths of a second lens 146 and a third lens 148 are such that the volume hologram 150 is also in the Fourier transform plane of the first Bragg cell 112, so that points in the first Bragg cell 112 are plane waves in the volume hologram. The volume hologram 150 is also approximately in the image planes of the second Bragg cell 142 and the third Bragg cell 144. Therefore, the vertical signal v(t) and the horizontal signal h(t) control the angular orientation of the plane waves at the volume hologram 150.

The volume hologram 150 is constructed such that the plane waves at the volume hologram (points in the first Bragg cell 112) are mapped into points on the photodiode array 120. The mapping is determined by the angular orientation of the plane waves at the volume hologram 150. The mapping of points in the first Bragg cell 112 onto the photodiode array 120, and therefore the steering angle of the planar array, is controlled by the vertical signal v(t) and the horizontal signal h(t).

A large set of point-to-point mappings may be required to generate the different time delays necessary for pointing an RF planar array in a large number of directions. Referring to FIG. 4, for example, the mapping of points from the first Bragg cell 112 is not required to be one-to-one for a planar array. For each orientation of the beam, some number of points in the Bragg cell 112 may be mapped to a larger number of photodiodes in the photodiode array 120.

Figure 5:
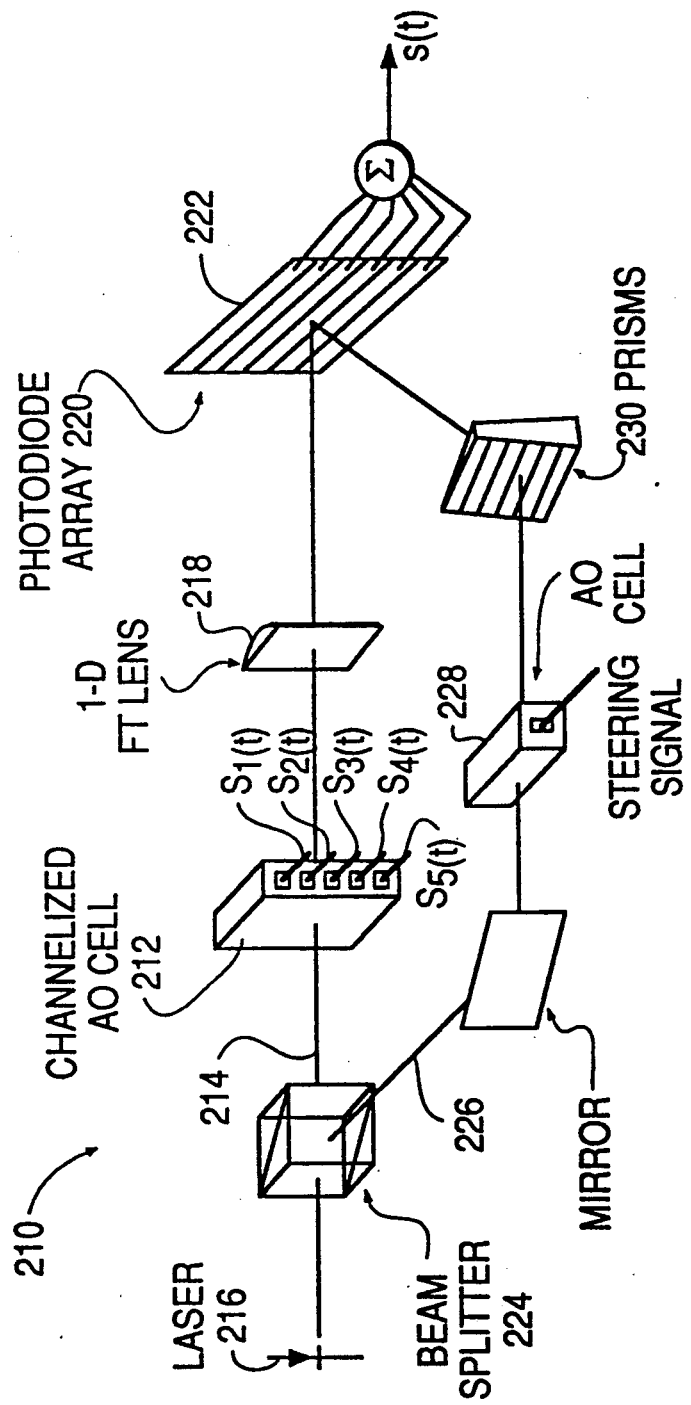
FIG. 5 shows an example of an acousto-optic system for generating a time delay for a one-dimensional receiving array.

FIG. 5 shows an example of an acousto-optic system 210 for generating a time delay for a one-dimensional receiving array. To form a beam in a particular direction with a receiving linear RF array, the outputs of the array elements must be delayed relative to one another and then summed. The amount of relative delay between the array elements may be determined by the spacing between the array elements and by the angle between the beam and the normal to the linear array.

The principle of how the system 210 illustrated in FIG. 5 delays a signal is essentially the same as for the system 10 for a one-dimensional transmitting array as shown in FIG. 1. In a first leg 214 of the system 210 illustrated in FIG. 5 a multi-channel Bragg cell 212 is used. The number of channels of the Bragg cell 212 is preferably equal to the number of antenna elements in the linear array. An electrical signal from each element of the receiving array drives a channel of the multi-channel Bragg cell 212. The signal in a channel of the multi-channel Bragg cell 212 is optically Fourier transformed onto a corresponding photodiode 222. As previously described herein, the electrical output of the photodiode 222 is a time delayed replica of the electrical signal that drives the corresponding channel of the multi-channel Bragg cell 212. The time delay may be determined by the angle between the reference plane wave from a second leg 226 of the illustrated system 210 and the face of the photodiode 222.

the second leg 226 of the illustrated system 210 functions substantially identically to the second leg 26 in the system 10 shown in FIG. 1 to generate time delays for transmitting a signal with a one-dimensional array. A stack of prisms 230 in the second leg 226 results in reference plane waves having a distribution of angles incident on the photodiode array 220. This allows a single channel Bragg cell 228, preferably driven with sine waves, to control a range of time delays.

The electrical outputs of the photodiodes 222 may be summed electrically. This sum is the signal arriving at the linear array from the direction determined by the frequency of the steering signal driving the Bragg cell 228 in the second leg 226 of the illustrated system 210.

The system shown in FIG. 5 may also be used for the formation and steering of beams for two-dimensional (planar) receiving arrays.

The projection of a pointing direction of a receiving array is a straight line on the face of the array. The time delays are all the same on each line on the array that is normal to this projection of the beam pointing direction. Therefore, to form a beam with a planar receiving array using the system shown in FIG. 5, the outputs of the array elements that lie along the lines normal to the projection of the desired beam pointing direction may first be summed electrically, one sum for each line. The spacing between the lines is approximately equal to the spacing between the antenna array elements that lie along the projection of the beam pointing direction onto the face of the antenna. The electrical sums may then be used to drive the channels of the channeling AO Bragg cell 212 shown in FIG. 5. The steering signal in this case determines the angle of the formed beam with respect to the normal to the face of the array.

The electrical outputs of the antenna array elements may be phase shifted before summing to compensate for the small deviations of positions of the array elements from the lines normal pointing direction.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for generating at least one time delay signal from an input signal, comprising:
   a source of coherent light,
   beam splitter means for splitting the coherent light into a first leg and a second leg,
   first modulation means associated with the first leg for modulating the coherent light with a modulation signal and for s the modulated coherent light into a spectrum, wherein the first modulation means defining a Fourier transform plane,
   second modulation means associated with the second leg for modulating the coherent light with a steering signal,
   optical element means associated with the second leg for receiving an input beam from the second modulation means at an incidence angle and for producing a plurality of reference waves having a plurality of orientations that are a function of the incidence angle,
   an array of photodiodes arranged substantially in the Fourier transform plane of the first modulation means for detecting interference between the spectrum associated with the first leg and the reference waves associated with the second leg and for producing an output signal corresponding to the detected interference,
   whereby each photodiode produces an output signal corresponding to the modulation signal delayed by a time factor that is a function of the angle of incidence of the reference wave on the photodiode.

2. The system as in claim 1 wherein each of the photodiodes in the array of photodiodes is oriented and proportioned for capturing the full spectrum of the modulated light signal illuminating the photodiode.

3. The system as in claim 1 wherein the optical element means comprises a plurality of prisms.

4. The system as in claim 1 wherein at least one of the first modulation means and the second modulation means comprises a Bragg cell.

5. The system as in claim 1 wherein the first modulation means comprises a Fourier transform lens.

6. The system as in claim 1 wherein the optical element means comprises a holographic optic element.

7. The system as in claim 3 wherein each one of the plurality of prisms is associated with a corresponding one of the plurality of photodiodes, and wherein each one of the plurality of photodiodes is illuminated by a reference wave output of a corresponding one of the plurality of prisms.

8. A system for generating at least one time delay signal from an input signal, comprising:
   a source of coherent light,
   first modulation means for modulating the coherent light with a modulation signal and for producing a plane wave output having an angular orientation, the first modulation means having a plurality of points and defining an image plane and a Fourier transform plane, the angular orientation of the plane wave output corresponding to the position of points in the first modulation means,
   an array of photodiodes arranged substantially in the image plane of the first modulation means,
   optical mapping means for optically mapping points in the first modulation means onto the array of photodiodes, the optical mapping means comprising:

second modulation means for controlling the angular orientation of the plane wave output of the first modulation means with respect to a first axis, third modulation means for controlling the angular orientation of the plane wave output of the first modulation means with respect to a second axis, the first axis and the second axis being substantially perpendicular and the second modulation means and the third modulation means each defining an image plane, a optical element, arranged substantially in the Fourier transform plane of the first modulation means and substantially in the image plane of the second modulation means and the third modulation means, for mapping plane waves at the optical element into points on the photodiode array, whereby the mapping of plane waves at the optical element into points on the photodiode array is determined by the angular orientation of the plane waves at the optical element, and whereby each photodiode produces an output signal corresponding to the modulation signal delayed by a time factor.

9. The system as in claim 8 comprising:

beam splitter means for splitting the coherent light into a first leg and a second leg, the second leg providing a reference signal at the photodiode array for heterodyne detection, whereby the output signals of the photodiode array are a function of the modulation signal.

10. The system as in claim 8 wherein at least one of the first modulation means, the second modulation means and the third modulation means comprises a Bragg cell.

11. The system as in claim 8 wherein the optical element comprises a volume hologram.

12. A system for time delaying a plurality of signals and for summing the plurality of delayed signals, comprising:

a source of coherent light, beam splitter means for splitting the coherent light into a first leg and a second leg, first multi-channel modulation means associated with the first leg for modulating the coherent light with a plurality of modulation signals and for separating the modulated coherent light into a spectrum, the first multi-channel modulation means defining a Fourier transform plane, second modulation means associated with the second leg for modulating the coherent light with a steering signal, optical element means associated with the second leg for receiving an input beam from the second modulation means at an incidence angle and for producing a plurality of reference waves having a plurality of orientations that are a function of the incidence angle, an array of photodiodes arranged substantially in the Fourier transform plane of the first multi-channel modulation means for detecting interference between the spectrum associated with the first leg and the reference waves associated with the second leg and for producing an output signal corresponding to the detected interference, whereby each photodiode produces an output signal corresponding to the modulation signal delayed by a time factor that is a function of the angle of incidence of the reference wave on the photodiode.

13. The system as in claim 12 wherein the optical element means comprises a plurality of prisms.

14. The system as in claim 12 wherein at least one of the first modulation means and the second modulation means comprises a Bragg cell.

15. The system as in claim 12 wherein the first modulation means comprises a Fourier transform lens.

* * * * *